United States Patent [19]

Kronies et al.

[11] 3,753,014

[45] Aug. 14, 1973

[54] FAST INHIBIT GATE WITH APPLICATIONS

[75] Inventors: Reinhard Kurt Kronies, Glendora, John Robert Coupland, El Monte, both of Calif.

[73] Assignee: Burroughs Corporation, Detroit, Mich.

[22] Filed: Mar. 15, 1971

[21] Appl. No.: 124,415

[52] U.S. Cl. .................. 307/217, 307/291, 328/195, 328/196, 328/206

[51] Int. Cl. ........................ H03k 19/20, H03k 19/38

[58] Field of Search ............................ 307/217, 291; 328/195, 196, 200, 204, 205

[56] References Cited

UNITED STATES PATENTS

| | | | |
|---|---|---|---|
| 2,909,675 | 10/1959 | Edson | 307/247 R |
| 3,321,639 | 5/1967 | Fowler et al. | 307/291 X |
| 3,609,569 | 9/1971 | Todd | 328/206 X |

*Primary Examiner*—John Zazworsky
*Attorney*—Christie, Parker & Hale

[57] ABSTRACT

An electronic circuit that has two input terminals and is responsive to three combinations of binary input signals is useful as a fast inhibit gate. The electronic circuit functions as an RS flip-flop for two of the combinations of binary input signals and as a combinational logic element for the third combination, which is the combination of a binary 1 on each input. Binary data to be transferred through the circuit is applied to one input terminal with the complement being applied to the other input terminal. An inhibit signal in the form of a binary 1 is applied to the same terminal to which the complement of the data is connected. In this way the inhibit signal may be applied directly to the electronic circuit rather than through additional logic elements with their attendant delay.

3 Claims, 2 Drawing Figures

| INPUTS S R | OUTPUTS 1 | |
|---|---|---|
| 1 0 | 1 | |
| 1 1 | 0 | INHIBITED |
| 0 1 | 0 | INHIBITED |

FAST INHIBIT GATE WITH APPLICATIONS

BACKGROUND OF THE INVENTION

FIELD OF THE INVENTION

This invention relates to an electronic circuit that has two input terminals and is responsive to three combinations of binary input signals. A fourth combination of input signals does not cause the circuit to change state and the circuit therefore is not considered to be responsive to this fourth combination. Therefore, only the three combinations that cause a change in state will be considered hereinafter unless otherwise noted. The circuit is useful as a fast inhibit gate.

A typical inhibit gate presently employed in computer systems employs an AND gate having two input terminals with the data to be transferred through the AND gate connected to one input terminal and a source of inhibit signals connected to the other input terminal through an inverter. Such an inhibit gate is relatively slow in operation because of the time delay for the passage of signals through the inverter and the AND gate. It has been found that a much faster inhibit gate results from the use of an electronic circuit that is designed to function as an RS flip-flop by applying the inhibit signal directly to the reset terminal of the circuit while employing the "1" or "on" output terminal of the circuit as the output terminal of the circuit. The electronic circuit functions as a combinational logic element when the inhibit signal in the form of a binary 1 is present and the data to be transferred is in the form of a binary 1. The fast inhibit gate that results is useful in a computer system where speed of operation is of prime consideration.

SUMMARY OF THE INVENTION

It has been found that electronic circuits designed for use as RS flip-flops with only two combinations of binary input signals, viz., 0,1 and 1,0 form very useful logic circuits when a third combination of input signals, viz., 1,1, are applied to the two inputs of the electronic circuit. This is disclosed in the copending application Ser. No. 123,959 filed concurrently herewith and assigned to the same assignee as this application. The electronic circuit of the referred to application is useful as a fast inhibit gate by proper sequencing and application of binary signals. Thus, the invention involves the method of employing as a fast inhibit gate an electronic circuit designed to function as an RS flip-flop having a set input terminal, a reset input terminal, and a single output terminal. The method comprises the steps of applying a binary 1 to be transferred through the circuit to the set terminal, applying the complement of the binary 1 to the reset terminal, and selectively applying a binary 1 to the reset terminal to inhibit the transfer of the binary 1 on the set terminal to the output of the electronic circuit.

The invention further includes the use of a fast inhibit gate between a source of binary coded data and a utilization means where the gate comprises an electronic circuit having two input terminals and at least one output terminal and functions as an RS flip-flop for a first and a second combination of binary input signals and as a combinational logic element for a third combination of binary input signals. In the fast inhibit gate there is included a means for connecting the output of the source to one of the input terminals and the binary complement of the output of the source to the other input terminal. The gate further includes an input terminal to the same input terminal to which the complement is connected for a source of a binary inhibit signal in the form of a binary 1.

BRIEF DESCRIPTION OF THE DRAWINGS

These and other features and advantages of the present invention may be understood more fully and clearly upon consideration of the following specification and drawings in which.

DESCRIPTION OF THE PREFERRED EMBODIMENT

Figures 1, 2:
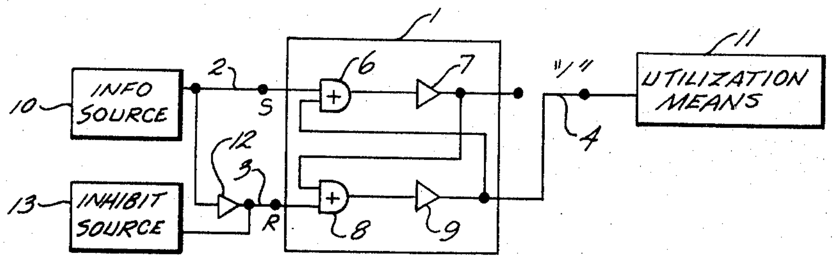
FIG. 1 is a block diagram of a fast inhibit gate in accordance with the present invention.
FIG. 2 is a truth table of the fast inhibit gate of FIG. 1.

The electronic device 1, shown in schematic form in FIG. 1, has two input terminals 2 and 3 and one output terminal 4. The electronic device 1 may be a circuit designed for use as an RS flip-flop and which functions as a combinational logic element for one combination of input signals as disclosed in the above mentioned copending application Ser. No. 123,959. The terms "RS flip-flop" and "combinational logic element" as used herein are defined as follows.

For the purpose of this application an RS flip-flop is a flip-flop having two inputs designated R and S, with a flip-flop being an electronic circuit having two stable states and the ability to change from one state to the other on application of a signal in a specified manner. In an RS flip-flop the specified manner is the application of a binary 1 on the set input, which will set the flip-flop to the "1" or "on" state, or the application of a binary 1 on the reset input, which will reset the flip-flop to the "0" or "off" state. As stated in the text "Reference Data for Radio Engineers", Fifth Edition, published by Howard W. Sams and Co., Inc. at page 20–5, in an RS flip-flop it is assumed that 1s will never appear simultaneously at both inputs. However, it has been found that for the case of binary 1s appearing at both inputs of the electronic device of FIG. 1, the device functions as the combinational logic element which is defined in the "Computer Dictionary" by Charles J. Sippl, edited by Howard W. Sams and Co., Inc., First Edition, on page 41, as a device having at least one output channel and one or more input channels, all characterized by discrete states, such that the state of each output channel is completely determined by the contemporaneous states of the input channels. Further for the purposes of this application, the terms "logic true" and "logic false" will be used interchangeably with the terms "binary 1" and "binary 0", respectively, unless specifically noted otherwise. However, this usage is not meant to detract from the broader definition of the terms "binary coded data" and "binary 1s" and "binary 0s", which terms in themselves include logic trues and logic falses, which are binary.

The electronic device 1 when designed for use as an RS flip-flop may advantageously include an OR gate 6 and an inverter 7 connected between input terminal 2 and the output terminal that is not used, which is the "0" or "off" output terminal of the device. The electronic device 1 may further include a second OR gate 8 and a second inverter 9 connected in series between the input terminal 3 and the output terminal 4, which is the "1" or "on" output terminal of the device. The output of inverter 9 is coupled to OR gate 6 as one input thereto, and the output of inverter 7 is coupled to OR gate 8 as one input to this gate. Logic OR gates are represented in the drawings of this application by plus signs within the block for the element, and logic AND gates are represented by dots within the block for the element.

The electronic device of FIG. 1 is useful as a fast inhibit gate when connected as shown in FIG. 1. The method of employing the electronic device 1 as a fast inhibit gate comprises the steps of applying a binary 1 to input 2 for causing a binary 1 to appear on the output 4 and when it is desired to inhibit the transfer of the binary 1 on input 2 through the electronic device 1, a binary 1 is applied to input 3 which inhibits the transfer of the binary 1 on input 2 to the output 4. A truth table for the electronic device 1 is set forth in FIG. 2.

A source 10 of binary data to be transferred through the electronic device 1 to a means 11 for utilizing the binary data is coupled to the input terminal 2 of the electronic device 1. The complement of the output of source 10 is applied to input 3 through an inverter 12. The complement of the source is applied to one input so that the forbidden combination of input signals, i.e., 0, 0, immediately following the combination of 1, 1, is prohibited. A source 13 of inhibit signals is connected to input 3 of the electronic device 1. A binary 1 from source 13 on input 3, even with a binary 1 on input 2 will result in a binary 0 appearing on output 4, which will remain a binary 0 until the inhibit signal of a binary 1 from source 13 is removed from input 3.

An inhibit gate presently used in the computer field includes an AND gate with two inputs. One input is connected to the data to be transferred through the AND gate and the other input is connected through an inverter to a source of inhibit signals. Because of the use of the inverter, a substantial delay in the passage of the inhibit signal to the AND gate to inhibit the transfer of the data from the source is occasioned. The total delay may be as much as 40 nanoseconds or more. This large delay is avoided in accordance with this invention by applying the inhibit signal directly to one input of the electronic device 1, which results in a fast inhibit gate having a total delay of approximately 10 nanoseconds, so that it is approximately four times faster than the presently used inhibit gate.

What is claimed is:

1. Method of employing as a fast inhibit gate an electronic circuit designed to function as an RS flip-flop having a set input terminal, a reset input terminal, and a single output terminal comprising the steps of applying a binary 1 to be transferred through the circuit to the set terminal, applying the complement of the binary 1 to the reset terminal, and selectively applying a binary 1 to the reset terminal to inhibit the transfer to the output of the circuit of the binary 1 on the set terminal.

2. A fast inhibit gate between a source of binary coded data and a utilization means comprising an electronic circuit having two input terminals and at least one output terminal, which circuit functions as an RS flip-flop for a first and a second combination of binary input signals and as a combinational logic element for a third combination of binary input signals; means for connecting the output of the source to one of the input terminals; means for connecting the binary complement of the output of the source to the other input terminal; and means for connecting a source of binary inhibit signal in the form of a binary 1 to the input terminal of the circuit that would be the reset terminal when operating as an RS flip-flop.

3. A fast inhibit gate circuit comprising an electronic device having a first and a second input terminal and at least one output terminal and functioning as an RS flip-flop for a binary 1,0 input on the two input terminals and for a binary 0,1 input on the two input terminals and as a combinational logic element for a binary 1,1 on the two input terminals;

means for connecting a source of binary coded data to the first input terminal;

means for connecting a source of a binary inhibit signal in the form of a binary 1 to the second input terminal; and an inverter circuit connected between the two input terminals for applying to the second input terminal the complement of the binary input applied to the first input terminal.

* * * * *